United States Patent
Griffith et al.

(10) Patent No.: US 9,482,867 B2
(45) Date of Patent: Nov. 1, 2016

(54) COMPENSATING FOR HYSTERESIS

(75) Inventors: Michael Stewart Griffith, Chelmsford (GB); Imdad Sajjad Badruddin Sardharwalla, Chelmsford (GB)

(73) Assignee: BAE SYSTEMS plc, London (GB)

( * ) Notice: Subject to any disclaimer, the term of this patent is extended or adjusted under 35 U.S.C. 154(b) by 618 days.

(21) Appl. No.: 13/496,428

(22) PCT Filed: Sep. 7, 2010

(86) PCT No.: PCT/GB2010/051487
§ 371 (c)(1),
(2), (4) Date: Mar. 15, 2012

(87) PCT Pub. No.: WO2011/033281
PCT Pub. Date: Mar. 24, 2011

(65) Prior Publication Data
US 2012/0179400 A1    Jul. 12, 2012

(30) Foreign Application Priority Data

Sep. 16, 2009  (EP) ................................ 09275081
Sep. 16, 2009  (GB) ................................ 0916245.4

(51) Int. Cl.
*G01R 19/00*   (2006.01)
*G02B 27/00*   (2006.01)
(Continued)

(52) U.S. Cl.
CPC ........... *G02B 27/0068* (2013.01); *G02B 26/06* (2013.01); *G02B 26/085* (2013.01); *G02B 26/0825* (2013.01); *G02F 2203/18* (2013.01)

(58) Field of Classification Search
CPC  G02B 26/0825; G02B 26/06; G02B 26/085; G02B 27/0068; G01R 33/0029; G02F 2203/18; G05B 17/02; H02N 2/062

USPC .......................................................... 702/64
See application file for complete search history.

(56) References Cited

U.S. PATENT DOCUMENTS 5,714,831 A    2/1998  Walker et al.
7,250,738 B1 * 7/2007  Ting ...................... H02N 2/062
                                                        318/701
(Continued)

FOREIGN PATENT DOCUMENTS

DE      19923462 C1    11/2000
WO      2009071898 A2   6/2009
WO      2011033281 A1   3/2011

OTHER PUBLICATIONS

S. Mittal, et. al. "Hysteresis Compensation in Electromagnetic Actuators Through Preisach Model Inversion", IEEE/ASME Transactions on Mechatronics, vol. 5, No. 4, Dec. 2000, pp. 394-409.*

(Continued)

*Primary Examiner* — Sujoy Kundu
*Assistant Examiner* — Ricky Ngon
(74) *Attorney, Agent, or Firm* — Finch & Maloney PLLC

(57) ABSTRACT

A method and apparatus for compensating for hysteresis in a system, the method comprising: determining a required input to the system from an output of the system using the Preisach model with the input of the Preisach model corresponding to the output of the system, and with the output of the Preisach model corresponding to the input of the system. The system may be an adaptive optics system. The input x may be an input voltage of an actuator that deforms a mirror, and the output y may be a value of a displacement of a mirror.

12 Claims, 7 Drawing Sheets

(51) Int. Cl.
G02B 26/06 (2006.01)
G02B 26/08 (2006.01)

(56) References Cited

U.S. PATENT DOCUMENTS

2008/0030824 A1 2/2008 Griffith et al.
2012/0179403 A1 7/2012 Griffith et al.

OTHER PUBLICATIONS

A. Dubra et. al., "Preisach classical and nonlinear modeling of hysteresis in piezoceramic deformable mirrors", Optics Express, vol. 13, No. 22, Oct. 31, 2005, pp. 9062-9070.*
Dubra, et. al, "Preisach classical and nonlinear modeling of hysteresis in piezoceramic deformable mirrors", Optics Express, vol. 13, No. 22, pp. 9062-9070, Oct. 31, 2005.*
Mittal, et. al, "Hysteresis Compensation in Electromagnetic Actuators Through Preisach Model Inversion, " IEEE Transactions on Mechatronics, vol. 5, No. 4, Dec. 2000, pp. 394-408.*
H. Hu et. al., "A discrete-time compensation algorithm for hysteresis in piezoceramic actuators", Mechanical Systems and Signal Processing, vol. 18, pp. 169-185, 2004.*
International Preliminary Report on Patentability for PCT International Patent Application No. PCT/GB2010/051488, mailed on Mar. 29, 2012.
International Search Report and Written Opinion for PCT International Patent Application No. PCT/GB2010/051488, mailed on Nov. 9, 2010.
Extended European Search Report for European Patent Application No. 09275081.9, mailed on Dec. 30, 2009.
Great Britain Search Report for British Patent Application No. GB0916245.4, mailed on Jan. 21, 2010.
Hu et al., Closed-Loop Control System of Piezoceramic Actuators with Improved Preisach Model, Proceedings of the 7th World Congress on Intelligent Control and Automation, Jun. 25, 2008, pp. 7385-7388.
Hu et al., A Discrete-Time Compensation Algorithm for Hysteresis in Piezoceramic Actuators, Mechanical Systems and Signal Processing, vol. 18, No. 1, 2004, pp. 169-185.
Mittal et al., Hysteresis Compensation in Electromagnetic Actuators Through Preisach Model Inversion, IEEE/ASME Transactions on Mechatronics, vol. 5, No. 4, Dec. 2000, pp. 394-409.
Fedrigo et al., Real-Time Control of ESO Adaptive Optics Systems, Automatisierungstechnik, vol. 53, No. 10, 2005, pp. 470-483.
Tu et al., Fuzzy Control Design of a Magnetically Actuated Optical Image Stabilizer with Hysteresis Compensation, Journal of Applied Physics, vol. 105, 2009.
Tan et al., Control of Hysteresis in Smart Actuators with Application to Micro-Positioning, Systems & Control Letters, vol. 54, 2005, pp. 483-492.
Ahn et al., Modeling and Control of Shape Memory Alloy Actuators Using Preisach Model, Genetic Algorithm and Fuzzy Logic, Mechatronics, vol. 18, 2008, pp. 141-152.
Chen et al., Hysteresis Compensation and Adaptive Controller Design for a Piezoceramic Actuator System in Atomic Force Microscopy, IEEE/ASME International Conference on Advanced Intelligent Mechatronics, Jul. 14, 2009, pp. 656-661.
Cavallo et al., Limit Cysles in Control Systems Employing Smart Actuators with Hysteresis, IEEE/ASME Transactions on Mechatronics, vol. 10, No. 2, Apr. 2005, pp. 172-180.
Kha et al., Hysteresis Compensation in SMA Actuators Through Numerical Inverse Preisach Model Implementation, KINTEX, Jun. 2, 2005.
Nguyen et al., Feedforward Control of Shape Memory Alloy Actuators Using Fuzzy-Based Inverse Preisach Model, IEEE Transactions on Control Systems Technology, vol. 17, Issue 2, Mar. 2009, pp. 434-441.
Ru, et al., "A hysteresis compensation method of piezoelectric actuator: Model, identification and control," Control Engineering Practice, vol. 17, No. 9, Sep. 1, 2009, pp. 1107-1114.
Jung, et al., "Hysteresis Modeling and Compensation in a Magnetostrictive Actuator," International Conference on Control, Automation and Systems, Oct. 14, 2008, pp. 483-487.
Ge, et al., "Tracking Control of a Piezoceramic Actuator," IEEE Transactions on Control Systems Technology, vol. 4, No. 3, May 1996, pp. 209-216.
Notice of Allowance Issued in U.S. Appl. No. 13/496,151. Mail Date: Feb. 12, 2015. 12 pages.
International Search Report and Written Opinion for PCT International Patent Application No. PCT/GB2010/051488, mailed on Feb. 24, 2011. 11 pages.
Extended European Search Report for European Patent Application No. 09275080.1, mailed on Dec. 2, 2009. 6 pages.
Great Britain Search Report for British Patent Application No. GB0916244.7, mailed on Jan. 18, 2010. 8 pages.
Non-Final Office Action Received for U.S. Appl. No. 13/496,151, dated Aug. 28, 2014. 22 pages.
Final Office Action Received for U.S. Appl. No. 13/496,151, dated Jan. 2, 2015. 14 pages.
International Preliminary Report on Patentability and Written Opinion received for Application No. PCT/GB2010/051487 . Report issued Mar. 20, 2013. 11 pages.
International Search Report received for Application No. PCT/GB2010/051487, dated Nov. 3, 2010. 4 pages.

* cited by examiner

COMPENSATING FOR HYSTERESIS

CROSS REFERENCE TO RELATED APPLICATIONS

This is the U.S. National Phase of PCT/GB2010/051487, filed Sep. 7, 2010, which claims priority to British Patent Application No. 0916245.4, filed Sep. 16, 2009 and European Patent Application No. 09275081.9, filed Sep. 16, 2009, each of which are incorporated by reference herein in their entireties.

FIELD OF THE INVENTION

The present invention relates to compensating for hysteresis, and other processes related to hysteresis.

BACKGROUND

The exhibition of hysteresis by certain materials used in certain systems, for example those used in a deformable mirror, is known.

A known problem relating to hysteresis in deformable mirrors is as follows. An input voltage is applied to an actuator in a deformable mirror, which causes it to change shape. When the input voltage is turned off, the actuator will return to its original shape in time, but in a slightly different manner. It is likely that the actuator will experience a second applied input voltage before it has returned to its original position. This causes the actuator to expand and contract in an unintended fashion. Thus, there is a degree of inaccuracy in the deformable mirror system.

Known methods of reducing the degree of this inaccuracy (i.e. methods of compensating for hysteresis in, for example, a deformable mirror) implement the Preisach model to model hysteresis in the material, and then implement an Inverse Preisach model to reduce the inaccuracy caused by hysteresis. Conventional applications of the Inverse Preisach model require large amounts of processing, for example much greater amounts of processing than is typically required for the forward Preisach model.

Conventionally, the Inverse Preisach model is implemented using a linear interpolation based inversion algorithm, which requires large amounts of processing. Also, an increasing input to the system tends not to consistently lead to an increasing output from the system. This can cause interpolation problems.

The remainder of this section introduces Preisach model terminology used later below in the description of embodiments of the present invention.

The Preisach model describes hysteresis in terms of an infinite set of elementary two-valued hysteresis operators (hysterons).

FIG. 1 is a schematic graph showing a typical input-output loop of a single two-valued relay hysteron, referred to hereinafter as a "hysteron". The x-axis of FIG. 1 represents an input voltage to the system, and is hereinafter referred to as the "input x". For example, the input x is the input voltage applied to an actuator that deforms a deformable mirror. The y-axis of FIG. 1 represents an output voltage from the system, and is hereinafter referred to as the "output y". For example, the output y is the displacement by which a deformable mirror is deformed by an actuator that has received an input voltage, e.g. the input x. FIG. 1 shows that the input x ranges from minus two to two. Also, the output y takes a value of zero or one. The ranges for the input x and the output y are merely exemplary, and may be different appropriate values. The output level of one corresponds to the system being switched 'on', and the output level of zero corresponds to the system being switched 'off'. The zero output level is shown in FIG. 1 as a bold line and is indicated by the reference numeral 10. The output level of one is shown in FIG. 1 as a bold line and is indicated by the reference numeral 12. FIG. 1 shows an ascending threshold $\alpha$ at a position corresponding to x=1, and a descending threshold $\beta$ at a position corresponding to x=-1.

Graphically, FIG. 1 shows that if x is less than the descending threshold $\beta$, i.e. -2<x<-1, the output y is equal to zero (off). As the input x is increased from its lowest value (minus two), the output y remains at zero (off) until the input x reaches the ascending threshold $\alpha$, i.e. as x increases, y remains at 0 (off) if -2<x<1. At the ascending threshold $\alpha$, the output y switches from zero (off) to one (on). Further increasing the input x from one to two has no change of the output value y, i.e. the hysteron remains switched 'on'. As the input x is decreased from its highest value (two), the output y remains at one (on) until the input x reaches the descending threshold $\beta$, i.e. as x decreases, y remains at 1 if -1<x<2. At the descending threshold $\beta$, the output y switches from one (on) to zero (off). Further decreasing the input x from minus one to minus two has no change of the output value y, i.e. the hysteron remains switched 'off'.

Thus, the hysteron takes the path of a loop, and its subsequent state depends on its previous state. Consequently, the current value of the output y of the complete hysteresis loop depends upon the history of the input x.

Within a material, individual hysterons may have varied $\alpha$ and $\beta$ values. The output y of the system at any instant will be equal to the sum over the outputs of all of the hysterons. The output of a hysteron with parameters $\alpha$ and $\beta$ is denoted as $\xi_{\alpha\beta}(x)$. Thus, the output y of the system is equal to the integral of the outputs over all possible hysteron pairs, i.e.

$$y = \iint_{\alpha \geq \beta} \mu(\alpha, \beta)\xi_{\alpha\beta}(x)d\alpha d\beta$$

where $\mu(\alpha,\beta)$ is a weighting, or density, function, known as the Preisach function.

This formula represents the Preisach model of hysteresis. The input to the system corresponds to the input of the Preisach model (these inputs correspond to x in the above equation). The output of the system corresponds to the output of the Preisach model (these outputs correspond to y in the above equation).

FIG. 2 is a schematic graph showing all possible $\alpha$-$\beta$ pairs for the hysterons in a particular material. All $\alpha$ and $\beta$ pairs lie in a triangle 20 shown in FIG. 2. The triangle 20 is bounded by: the minimum of the input x (minus two); the maximum of the input x (two); and the line $\alpha=\beta$ line (since $\alpha \geq \beta$).

Increasing the input x from its lowest amount (minus 2) to a value x=$u_1$ provides that all of the hysterons with an $\alpha$ value less than the input value of $u_1$ will be switched 'on'. Thus, the triangle 20 of FIG. 2 is separated into two regions. The first region contains all hysterons that are switched 'on', i.e. the output y equals a value of one. The second region contains all hysterons that are switched 'off', i.e. the output y equals a value of zero. FIG. 3 is a schematic graph showing the region of all possible $\alpha$-$\beta$ pairs, i.e. the triangle 20, divided into the above described two regions by increasing the input x from its lowest amount to a value x=$u_1$. The first region, i.e. the region that contains all hysterons that are switched 'on' is hereinafter referred to as the "on-region 22". The second region, i.e. the region that contains all hysterons that are switched 'off' is hereinafter referred to as the "off-region 24".

Decreasing the input x from the value $x=u_1$ to a value $x=u_2$ provides that all of the hysterons with a $\beta$ value greater than the input value of $u_2$ will be switched 'off'. Thus, the on-region 22 and the off-region 24 of the triangle 20 change as the input x is decreased from the value $x=u_1$ to the value $x=u_2$. FIG. 4 is a schematic graph showing the regions 22, 24 of the triangle 20 formed by decreasing the input x from the value $x=u_1$ to the value $x=u_2$, after having previously increased the input x as described above with reference to FIG. 3.

An increasing input can be thought of as a horizontal link that moves upwards on the graph shown in FIGS. 2-4. Similarly, a decreasing input can be thought of as a vertical link that moves towards the left on the graph shown in FIGS. 2-4.

By alternately increasing and decreasing the input x, the triangle 20 is separated in to two regions, the boundary between which has a number of vertices. FIG. 5 is a schematic graph showing the regions 22, 24 of the triangle 20 formed by alternately increasing and decreasing the input x. Alternately increasing and decreasing the input x produces a "staircase" shaped boundary between the on-region 22 and the off-region 24, hereinafter referred to as the "boundary 300". The boundary 300 has four vertices, referred to hereinafter as the "first x-vertex 30" (which has coordinates $(\alpha_1,\beta_1)$, the "second x-vertex 32" (which has coordinates $(\alpha_2,\beta_1)$), the "third x-vertex 34" (which has coordinates $(\alpha_2,\beta_2)$), and the "fourth x-vertex 36" (which has coordinates $(\alpha_3,\beta_2)$).

In FIG. 5 the final voltage change in the input x is a decreasing voltage change (as indicated by the vertical line from the third x-vertex 34 to the line $\alpha=\beta$). However, it is possible for the final voltage change in the input x to be an increasing voltage change. This could be considered to be followed by a decreasing voltage change of zero for convenience.

For the Preisach Model to represent a material's behaviours, the material has to have the following two properties: the material must have the wiping-out property, which provides that certain increases and decreases in the input x can remove or 'wipe-out' x-vertices; and the material must have the congruency property, which states that all minor hysteresis loops that are formed by the back-and-forth variation of inputs between the same two extremum values are congruent.

The output y of the system is dependent upon the size and shape of the on-region 22. The on-region 22, in turn, is dependent upon the x-vertices 30, 32, 34, 36. Thus, as described in more detail later below, the output y of the system can be determined using the x-vertices 30, 32, 34, 36 of the boundary between the on-region 22 and the off-region 24.

The output y of the system illustrated by FIG. 5 is:

$$y = \iint_{\alpha \geq \beta} \mu(\alpha, \beta)\xi_{\alpha\beta}(x)d\alpha d\beta =$$

$$\iint_{\text{on-region}} \mu(\alpha, \beta)\xi_{\alpha\beta}(x)d\alpha d\beta + \iint_{\text{off-region}} \mu(\alpha, \beta)\xi_{\alpha\beta}(x)d\alpha d\beta$$

In the on-region 22, all hysterons are switched on, and therefore $\xi_{\alpha\beta}(x)=1$. Similarly, in the off-region 24 all hysterons are switched off, and therefore $\xi_{\alpha\beta}(x)=0$. Thus, $$y = \iint_{\text{on-region}} \mu(\alpha, \beta) \cdot 1 \cdot d\alpha d\beta + \iint_{\text{off-region}} \mu(\alpha, \beta) \cdot 0 \cdot d\alpha d\beta =$$

$$\iint_{\text{on-region}} \mu(\alpha, \beta)d\alpha d\beta$$

By considering the x-vertices on the boundary 300, it can be shown that the integral can be estimated as follows:

$$y = \sum_{k=1}^{n}(y_{\alpha_k \beta_k} - y_{\alpha_k \beta_{k-1}})$$

where:
$y_{\alpha_i \beta_j}$ is the output y resulting from increasing the input voltage x from the minimum to $\alpha_i$ and then decreasing it to $\beta_j$;
$\beta_0$ is the minimum saturation voltage, i.e. minus two; and
n is the number of vertical trapezia formed by the x-vertices on the boundary 300, i.e. n is therefore equal to $\lfloor \frac{1}{2}\times\text{number of vertices}\rfloor$.

In practice, to calculate the above equation, values of $y_{\alpha\beta}$ for a number of points in the triangle 20 are generated. Typically, a value of $y_{\alpha\beta}$ for each $\alpha$-$\beta$ pairs in a grid of $\alpha$-$\beta$ pairs in the triangle 20 is calculated. This is done by increasing the input x from its minimum (minus two) to $\alpha$, and then decreasing it to $\beta$, and measuring the output y of the system. For $\alpha$-$\beta$ pairs not on the grid, a value of $y_{\alpha\beta}$ is found using bilinear interpolation, or linear interpolation, using $\alpha$-$\beta$ pairs on the grid.

SUMMARY OF THE INVENTION

In a first aspect the present invention provides a method of compensating for hysteresis in a system, the method comprising: determining a required input to the system from an output of the system using the Preisach model with the input of the Preisach model corresponding to the output of the system, and with the output of the Preisach model corresponding to the input of the system.

Using the Preisach model with the input of the Preisach model corresponding to the output of the system, and with the output of the Preisach model corresponding to the input of the system, may comprise determining a value of an input x to the system using the following formula:

$$x = \iint_{\gamma \geq \delta} \lambda(\gamma, \delta)\varepsilon_{\gamma\delta}(y)d\gamma d\delta$$

where: y is an output of the system; $\gamma$ is the level to which the output y is increased as the input x is increased; $\delta$ is the level to which the output y is decreased as the input x is decreased; $\lambda(\gamma,\delta)$ is a density function; and $\varepsilon_{\gamma\delta}(y)$ is the output of an imaginary hysteron having parameters $\gamma$ and $\delta$.

Using the Preisach model with the input of the Preisach model corresponding to the output of the system, and with the output of the Preisach model corresponding to the input of the system, may comprise determining a value of an input x to the system using the following formula:

$$x = \sum_{k=1}^{n} (x_{\gamma_k \delta_k} - x_{\gamma_k \delta_{k-1}})$$

where: $x_{\gamma_i \delta_j}$ is the input of the system resulting from increasing the output y from the minimum output to $\gamma_i$ and then decreasing it to $\delta_j$; and $\delta_0$ is the minimum output.

The formula $$x = \sum_{k=1}^{n} (x_{\gamma_k \delta_k} - x_{\gamma_k \delta_{k-1}})$$

may be calculated by: determining a value for $x_{\gamma\delta}$ for each $\gamma$-$\delta$ pair in a discrete set of $\gamma$-$\delta$ pairs; and for all required values of $x_{\gamma_i \delta_j}$ where $\gamma_i$ and $\delta_j$ are not in the discrete set, determining the value of $x_{\gamma_i \delta_j}$ using a process of interpolation using values of $x_{\gamma\delta}$ where $\gamma$ and $\delta$ are in the discrete set.

The system may be an adaptive optics system.

The input x may be an input voltage of an actuator that deforms a deformable mirror, and the output y may be a value of a displacement of a deformable mirror.

The method may further comprise a process of determining an updated required input to the system, the determining process comprising: measuring a value of the input to the system; and determining the updated required input to the system using the determined required input to the system and the measured required input to the system.

The method may further comprise a process of determining an updated required input to the system, the determining process comprising: measuring a value of the output of the system to determine a measured output value corresponding to the determined required input; and determining the updated required input to the system using the measured output value and the output of the system.

In a further aspect the present invention provides an apparatus adapted to perform the method of any of any of the above aspects.

In a further aspect the present invention provides a computer program or plurality of computer programs arranged such that when executed by a computer system it/they cause the computer system to operate in accordance with the method of any of the above aspects.

In a further aspect the present invention provides a machine readable storage medium storing a computer program or at least one of the plurality of computer programs according to the above aspect.

DETAILED DESCRIPTION

Figure 6:
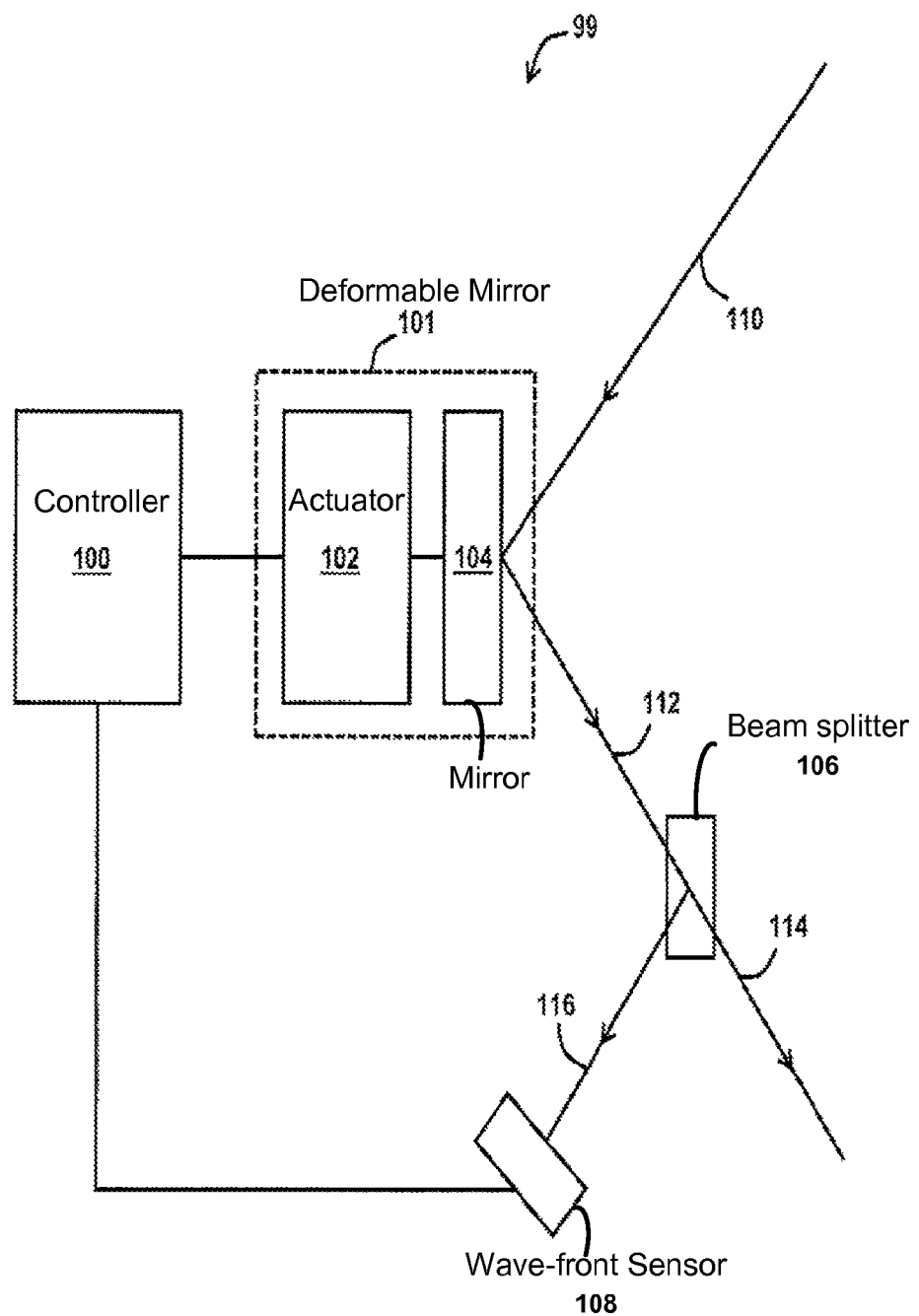
FIG. 6 is a schematic illustration of a mirror interrogation system.

FIG. 6 is a schematic illustration of a mirror interrogation system 99 in which an Inverse Preisach model is performed. The Inverse Preisach model is implemented in an embodiment of compensating for hysteresis, as described later below with reference to FIG. 10, after the description of the Inverse Preisach model.

The mirror interrogation system 99 comprises a controller 100, a deformable mirror 101, a beam-splitter 106, and a wave-front sensor 108. The deformable mirror 101 comprises an actuator 102 and a mirror 104.

The controller 100 comprises an output and an input. The output of the controller 100 is connected to the actuator 102. The input of the controller is connected to the wave-front sensor 108. The controller 100 receives a signal from the wave-front sensor 108. The controller processes the signal received from the wave-front sensor 108, as described in more detail later below. The controller 100 sends a control signal to the actuator 102. The control signal depends on the signal received by the controller 100 from the wave-front sensor 108, as described in more detail later below.

The actuator 102 comprises an output and an input. The input of the actuator 102 is connected to the controller 100. The output of the actuator 102 is connected to the mirror 104. The actuator 102 receives the control signal from the controller 100. The actuator changes the shape of, or deforms, the mirror 104 via the actuator output, depending on the received control signal. In this embodiment, the control signal received by the actuator is an input voltage. This input voltage to the actuator corresponds to the input x for a Preisach model, as described above and referred to later below. The value of the input x determines the amount by which the actuator 102 deforms the mirror 104.

The mirror 104 is deformed by the actuator 102. The displacement of the mirror, i.e. the amount by which the mirror 104 is deformed by the actuator 102, corresponds to the output y for a Preisach model, as described above and referred to later below.

In this embodiment, a beam of light is reflected and split by the mirror interrogation system 99. The beam of light is indicated by arrows in FIG. 6. For clarity and ease of understanding, the beam of light is shown as separate sections: a first section of the beam of light that is incident on the mirror 104, (the first section is hereinafter referred to as the "incident beam 110"); a second section of the beam of light that is reflected from the mirror 104 and is incident on the beam-splitter 106 (the second is hereinafter referred to as the "reflected beam 112"); and a third section and a fourth section of the beam of light that are formed by the beam splitter 106 splitting the reflected beam (the third section is hereinafter referred to as the "image beam 114" and the fourth section is hereinafter referred to as the "feedback beam 116").

The beam splitter splits the reflected beam 106 into the image beam 114 and the feedback beam 116.

The feedback beam 116 is incident on the wave-front sensor 108.

The wave-front sensor 108 detects the feedback beam 116. The wave-front sensor 108 measures a value of the curvature of the mirror 104. The wave-front sensor 108 comprises an output. The wave-front sensor 108 sends a signal corresponding to the detected feedback beam 116, i.e. a signal corresponding to the curvature of the mirror 104, to the controller 100 via the output of the wave-front sensor 108.

The controller 100 receives the signal corresponding to the detected feedback beam 116 from the wave-front sensor 108. In this embodiment, the controller 100 comprises a processor (not shown). The processor uses the signal corresponding to the detected feedback beam 116 to determine a value corresponding to the displacement of the mirror 104, i.e. a value for the output y of the Preisach model. The processor further generates a control signal, i.e. the input x for the Preisach model, using the determined output y. The control signal is sent to the actuator 102, and the actuator 102 deforms the mirror 104 depending on the received control signal as described above.

An embodiment in which an Inverse Preisach model is performed, in the mirror interrogation system 99 described above with reference to FIG. 6, will now be described. In this embodiment, a problem of obtaining an inverse result for the Preisach model is addressed making use of aspects of the forward Preisach model, as opposed to using the conventional approach of interpolation-based techniques.

In this embodiment, the deformable mirror 101 has the wiping-out property as described above for the forward Preisach model, and described below for this embodiment.

Figure 1:
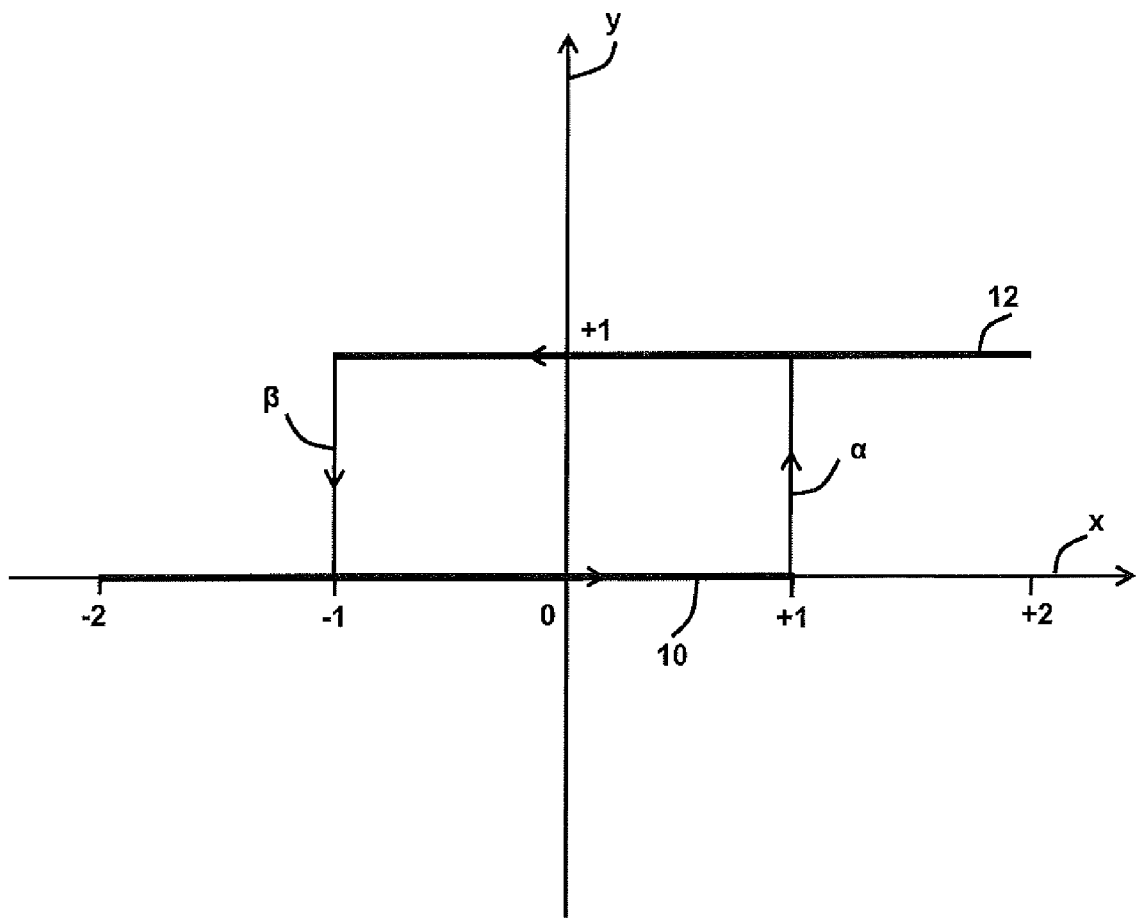
FIG. 1 is a schematic graph showing a typical input-output loop of a single two-valued relay hysteron.
Figure 2:
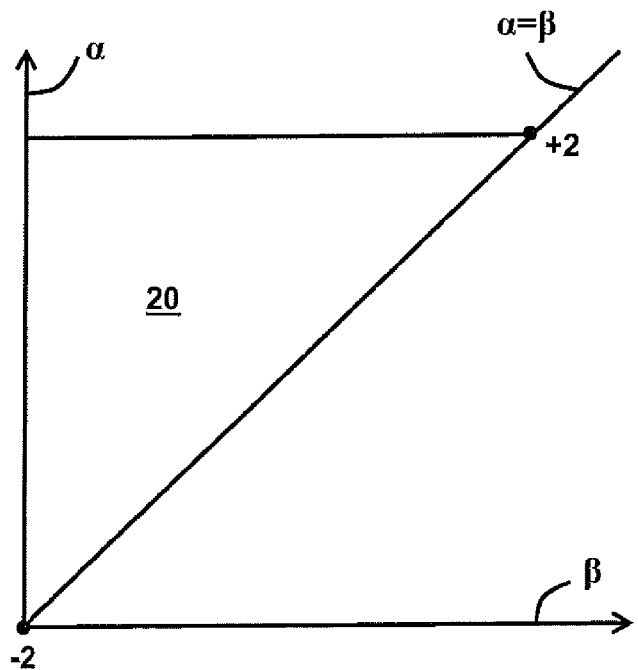
FIG. 2 is a schematic graph showing all possible $\alpha$-$\beta$ pairs for the hysterons in a particular material.
Figure 3:
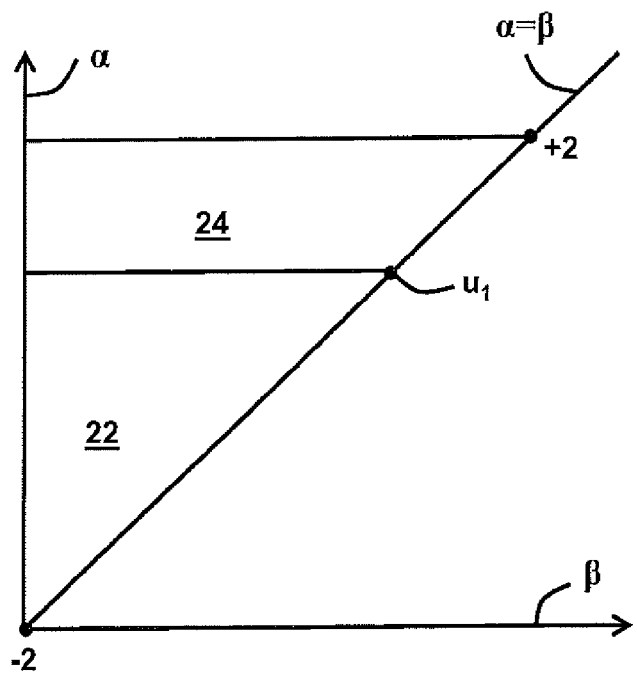
FIG. 3 is a schematic graph showing the region of all possible $\alpha$-$\beta$ pairs.
Figure 4:
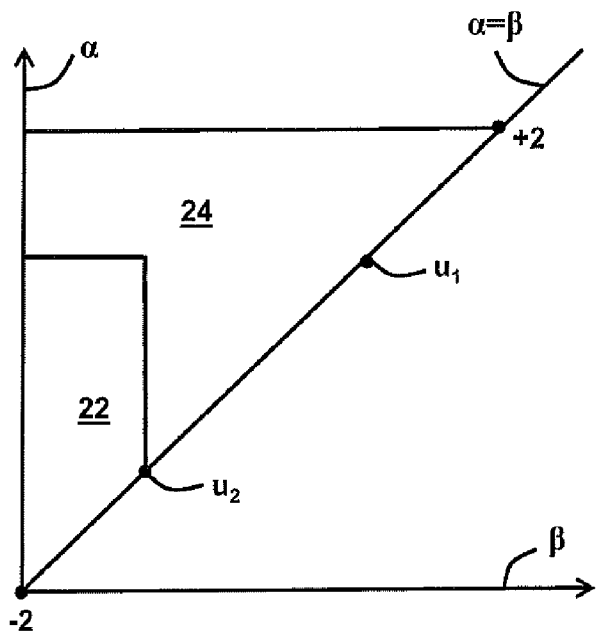
FIG. 4 is a schematic graph showing the on-region and off-region of the region of all possible $\alpha$-$\beta$ pairs formed by decreasing the input x from the value x=$u_1$ to the value x=$u_2$.
Figure 5:
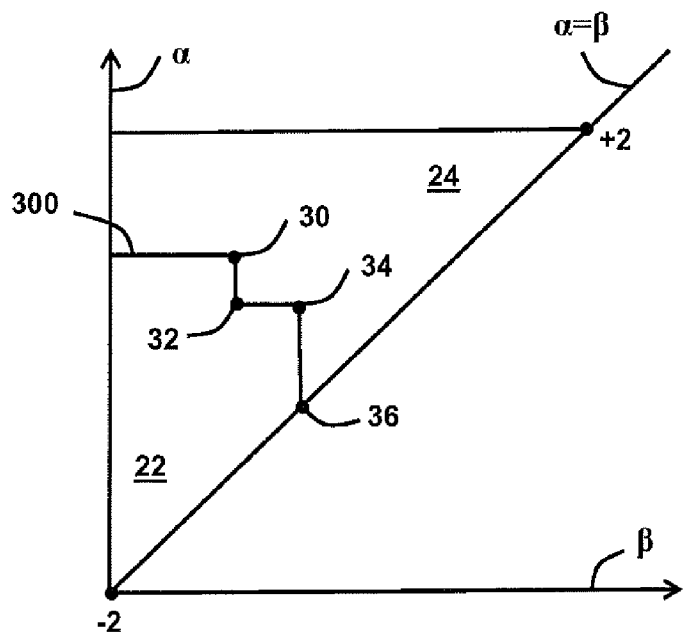
FIG. 5 is a schematic graph showing the on-region and off-region of the region of all possible $\alpha$-$\beta$ pairs formed by alternately increasing and decreasing the input x.

As described in more detail above, alternately increasing and decreasing the input x (which in this embodiment is the input voltage applied to the actuator 102) produces the α-β graph shown in FIG. 5. The α-β graph shown in FIG. 5 shows the first x-vertex 30, the second x-vertex 32, the third x-vertex 34, and the fourth x-vertex 36.

The output y (which in this embodiment is the displacement of the mirror 104 by the actuator 102) of the system is, in general, an increasing function with respect to the input x, i.e. as the input x increases, the output y increases, and as the input x decreases, the output y decreases. Thus, alternately increasing and decreasing the input x, produces alternating increases and decreases in the output y. This is shown schematically in FIG. 7.

Figure 7:
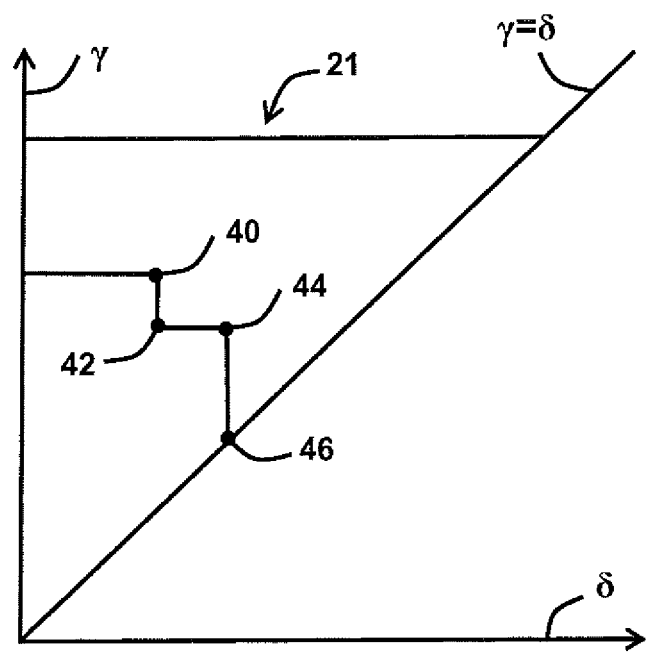
FIG. 7 is a schematic graph showing the space of possible increases and decreases in the output y generated by alternately increasing and decreasing the input x.

FIG. 7 is a schematic graph showing the space of possible increases and decreases in the output y generated by the increasing and decreasing of the input x. The vertical axis of FIG. 7 is the level to which the output y is increased as the input x is increased, indicated by the reference sign γ. The horizontal axis of FIG. 7 is the level to which the output y is decreased as the input x is decreased, indicated by the reference sign δ. The space of all possible γ-δ pairs is indicated in FIG. 7 by the reference number 21. The space of γ-δ pairs 21 corresponds to the triangle 20 of all possible α-β pairs for the hysterons in a particular material, as described above with reference to FIGS. 2-5. The space of γ-δ pairs 21 is bounded by: the minimum of the output y (zero); the maximum of the output (one); and the line γ=δ line (since γ≥δ).

FIG. 7 further shows the output y that is produced by the input x being alternately increased and decreased according to the α-β graph shown in FIG. 5. In this embodiment, the output y comprises four vertices, hereinafter referred to as the "first y-vertex 40" (which has coordinates ($\gamma_1$, $\delta_1$)), the "second y-vertex 42" (which has coordinates ($\gamma_2$, δ1)), the "third y-vertex 44" (which has coordinates ($\gamma_2$, $\delta_2$)), and the "fourth y-vertex 46" (which has coordinates ($\gamma_3$, $\delta_2$)).

The first x-vertex 30 of the boundary 300 shown in the α-β graph for the input x (FIG. 5) corresponds to the first y-vertex 40 for the output y shown in FIG. 7. In other words, as the input x is increased to $\alpha_1$, the output y correspondingly increases to $\gamma_1$. Then, as the input x is decreased to $\beta_1$, the output y correspondingly decreases to $\delta_1$.

The second x-vertex 32 of the boundary 300 shown in the α-β graph for the input x (FIG. 5) corresponds to the second y-vertex 42 for the output y shown in FIG. 7. In other words, as the input x is decreased to $\beta_1$, the output y correspondingly decreases to $\delta_1$. Then, as the input x is increased to $\alpha_2$, the output y correspondingly increases to $\gamma_2$.

The third x-vertex 34 of the boundary 300 shown in the α-β graph for the input x (FIG. 5) corresponds to the third y-vertex 44 for the output y shown in FIG. 7. In other words, as the input x is increased to $\alpha_2$, the output y correspondingly increases to $\gamma_2$. Then, as the input x is decreased to $\delta_2$, the output y correspondingly decreases to $\delta_2$.

The fourth x-vertex 36 of the boundary 300 shown in the α-β graph for the input x (FIG. 5) corresponds to the fourth y-vertex 46 for the output y shown in FIG. 7. In other words, as the input x is decreased to $\delta_2$, the output y correspondingly decreases to $\delta_2$. Then, as the input x is increased to $\alpha_3$, the output y correspondingly increases to $\gamma_3$.

In this embodiment, the wiping-out property, which holds for the α-β graph for the input x shown in FIG. 5, also holds for the γ-δ graph for the output y shown in FIG. 7. For example, if the input x is decreased from its value at the fourth x-vertex 36 to the β-value value of the second x-vertex 32, i.e. to $\beta_1$, then the second, third and fourth x-vertices 32, 34, 36 are wiped out. Thus, the output y is only dependent on the first x-vertex 30. The first x-vertex 30 corresponds to the first y-vertex 40 in FIG. 7, and so the output y depends only on the first y-vertex 40, i.e. the second, third, and fourth y-vertices 42, 44, 46 have been wiped out. A similar argument can be constructed for an increasing value of the input x. In this embodiment, the wiping-out property holds if y is an increasing function with respect to x. In practice this requirement can be assumed to hold (even though no material is perfect and therefore y is not quite an increasing function) because the material properties are such that useful results are nevertheless produced.

In this embodiment, the congruency property, which holds for the α-β graph for the input x shown in FIG. 5, does not necessarily hold true for the inverse. For example, the output y is to be increased from $y_1$ to $y_2$. To do this, the input x is increased from $x_1$ to $x_2$. To return the output y to $y_1$, the input x is decreased to $x_1$. Thus, each time the output y is increased from $y_1$ to $y_2$ and decreased to $y_1$ again, an identical 'loop' of input values values is created. However, the input x (and/or the output y) may have a history that requires a different value of $x_1$ to bring the output to $y_1$, and a different value of $x_2$ to bring the output to $y_2$. $x_2$ and $x_1$ are not necessarily the same, thus increasing the output y from $y_1$ to $y_2$ and back to $y_1$ may not result in congruent 'loops' of the input x values for all input histories. In other words, the range over which the input x is varied to produce a particular loop in the output y changes with different input histories.

In this embodiment, it is not necessary for the congruency property to hold for the inverse because, in practice, the material tends not to have a perfect congruency property for the forward Preisach model. Also, minor hysteresis loops near the centre of the major hysteresis loop are likely to all be very similar. In practice, the better the congruency property holds, the better the inverse Preisach model, herein described, will work. In other words, the material does not have a perfect 'forward' congruency property, so the 'inverse' congruency property tends not be detrimentally limited. Also, for readings in the middle of the hysteresis loop, all of the loops are quite similar. Thus, the congruency property tends to hold reasonably well in this middle range.

The formula for the inverse model is:

$$x = \iint_{\gamma \geq \delta} \lambda(\gamma, \delta)\varepsilon_{\gamma\delta}(y) d\gamma d\delta$$

Where:
$\lambda(\gamma,\delta)$ is a density function; and
$\varepsilon_{\gamma\delta}(y)$ is the output of an imaginary hysteron having parameters $\gamma$ and $\delta$.

This formula represents an Inverse Preisach model of hysteresis for the present embodiment. The input to the system, i.e. the input voltage to the actuator 102, corresponds to the output of the Inverse Preisach model (these correspond to x in the above equation). The output of the system, i.e. the displacement of the mirror 104, corresponds to the input of the Inverse Preisach model (these correspond to y in the above equation).

This formula can be rewritten as a summation, in the same way as for the forward model:

$$x = \sum_{k=1}^{n} (x_{\gamma_k \delta_k} - x_{\gamma_k \delta_{k-1}})$$

where:
$x_{\gamma_i \delta_j}$ is the input x resulting from increasing the output y from the minimum (in this embodiment, the minimum output is zero) to $\gamma_i$ and then decreasing it to $\delta_j$; and
$\delta_0$ is the minimum output, i.e. zero.
n is the number of vertical trapezia formed by the y-vertices in triangle 21, and is therefore equal to [½× number of vertices].

As described above for the forward Preisach model, values of $x_{\gamma\delta}$ where $\gamma$ and/or $\delta$ are not on the grid, is found using bilinear or linear interpolation using determined values of $x_{\gamma\delta}$ where $\gamma$ and $\delta$ are on the grid.

In this embodiment, the minimum output is 0. However, in other embodiments, the minimum output is not zero. In embodiments in which the minimum output is not zero, an appropriate additional constant is added to the sum/integral in the above equations for the inverse Preisach model to account for the non-zero minimum output.

In a corresponding way to performing the forward Preisach model, a value of the input x is generated for each $\gamma$-$\delta$ pair in a grid of $\gamma$-$\delta$. These values are hereinafter denoted as $x_{\gamma\delta}$. For $\gamma$-$\delta$ pairs not on the grid, a value of x is found using bilinear interpolation, or linear interpolation, using $\gamma$-$\delta$ pairs on the grid.

In this embodiment, the grid input values are generated using the forward Preisach model. The input x is increased slowly (i.e. in small increments) until y=$\gamma$, and then the input x is slowly decreased until y=$\beta$. This embodiment of implementing an Inverse Preisach model is described in more detail later below, with reference to FIG. 7. The forward Preisach model, utilised as described above, advantageously tends not to suffer from creep. Also, the forward Preisach model advantageously tends to be time-independent, and have perfect wiping-out and congruency properties. In other embodiments, the grid of input values $x_{\gamma\delta}$ could be generated by implementing the above method using the deformable mirror instead of the forward Preisach Model. However, the deformable mirror may suffer from creep and may not perfectly satisfy the Preisach criteria, i.e. the deformable mirror may not have perfect wiping-out and congruency properties.

Figure 8:
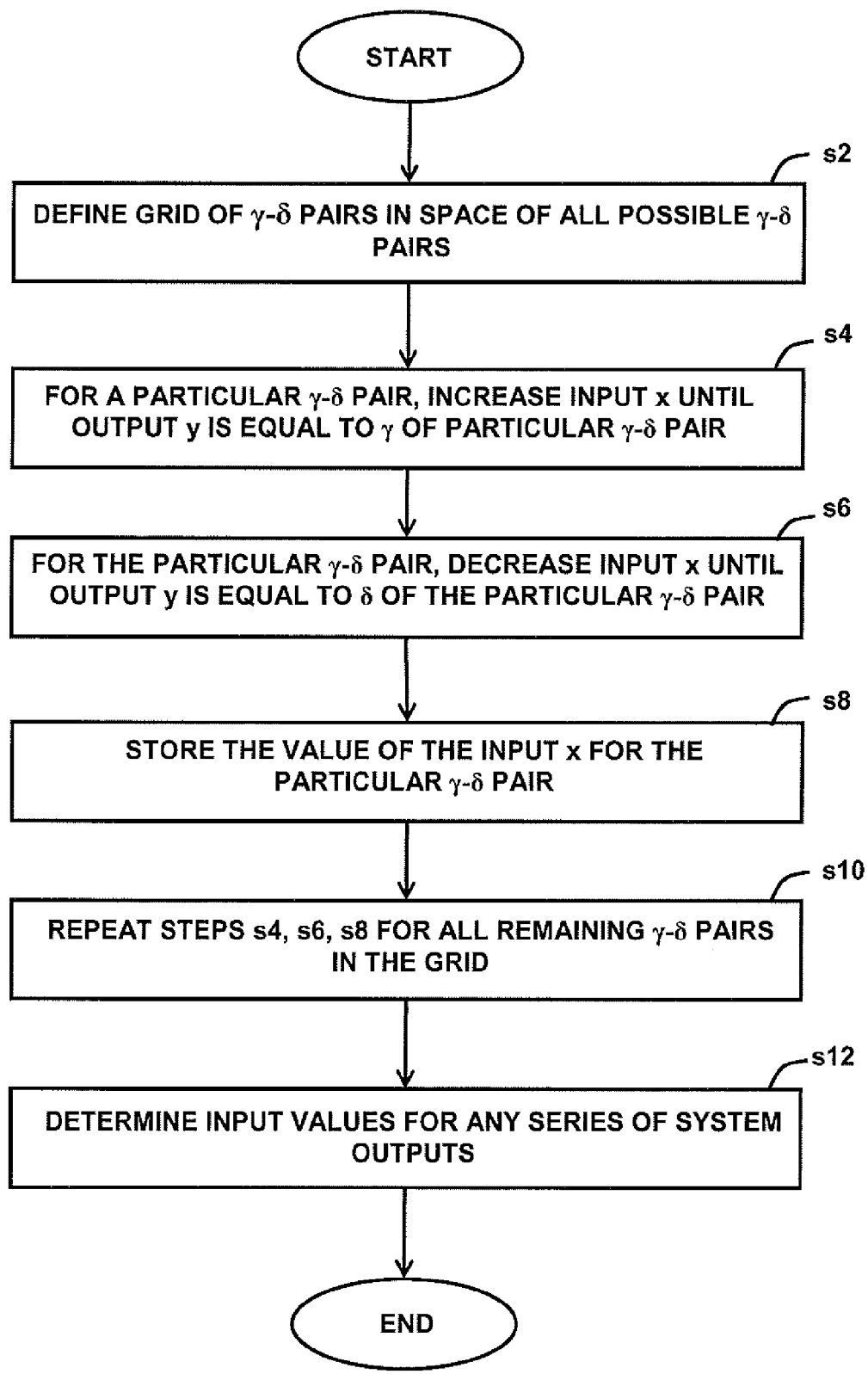
FIG. 8 is a process flow chart showing a method of implementing an Inverse Preisach model according to an embodiment of the present invention.

FIG. 8 is a process flow chart showing a method of implementing an Inverse Preisach model according to the above described embodiment.

At step s2, a grid of $\gamma$-$\delta$ pairs is defined on the space of all possible $\gamma$-$\delta$ pairs. In other words, a grid of points is defined on the space of $\gamma$-$\delta$ pairs 21 shown in FIG. 7.

Figure 9:
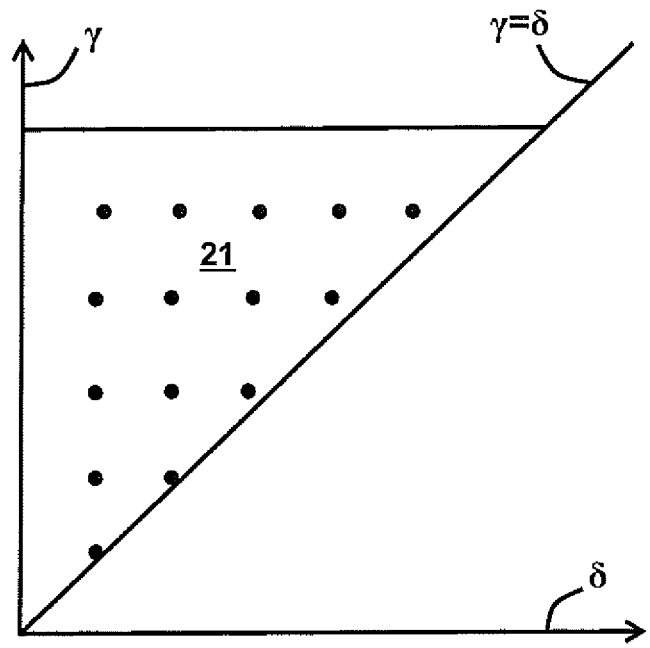
FIG. 9 is a schematic graph showing a grid of $\gamma$-$\delta$ pairs defined on the space of all possible $\gamma$-$\delta$ pairs.

FIG. 9 is a schematic graph showing a grid of $\gamma$-$\delta$ pairs (indicated by dots in the space of $\gamma$-$\delta$ pairs 21) defined on the space of all possible $\gamma$-$\delta$ pairs (the space of $\gamma$-$\delta$ pairs 21).

At step s4, for a particular $\gamma$-$\delta$ pair, the input x to the system is slowly increased from the minimum input (minus two) until the output y of the system equals the value of $\gamma$ of the particular $\gamma$-$\delta$ pair.

At step s6, for the particular $\gamma$-$\delta$ pair, the input x to the system is slowly decreased until the output y of the system equals the value of $\delta$ of the particular $\gamma$-$\delta$ pair.

At step s8, the value of the input x after having performed the steps s4 and s6 above is stored in a table for that particular $\gamma$-$\delta$ pair, i.e. the value of the input x is stored as $x_{\gamma\delta}$, as described above.

At step s10, the steps s4, s6 and s8 are repeated for all remaining $\gamma$-$\delta$ pairs. Thus, for each value of the output y that is defined as a point on the grid of $\gamma$-$\delta$ pairs in FIG. 8, a corresponding value $x_{\gamma\delta}$ of the input x that is required to produce such an output $\gamma$, is determined and stored.

In this embodiment, steps s2-s10, as described above, are performed once and the grid of input values $x_{\gamma\delta}$ is stored and used as a reference for performing step s12.

At step s12, the input x for a series system of outputs is calculated using the formula (described earlier above):

$$x = \sum_{k=1}^{n} (x_{\gamma_k \delta_k} - x_{\gamma_k \delta_{k-1}})$$

where:
$x_{\gamma_i \delta_j}$ the input x resulting from increasing the output y from the minimum to $\gamma_i$ and then decreasing it to $\delta_j$ (zero);
$\delta_0$ is the minimum output, i.e. zero; and
n is the number of vertical trapezia formed by the y-vertices in triangle 21, and is therefore equal to $\lfloor$½× number of vertices$\rfloor$.

A value of $x_{\gamma\delta}$ for values of $\gamma$ and/or $\delta$ not on the grid, is found using bilinear interpolation, or linear interpolation, using determined grid values of $x_{\gamma\delta}$.

Thus, a method of performing an Inverse Preisach model is provided. The provided inverse procedure tends to be faster than conventional, iterative inverse procedures.

A further advantage is that algorithms prepared for the forward Preisach model tend to be usable (with the alternative grid of points) for implementing the provided inverse procedure.

A further advantage of above described Inverse Preisach model is that the grid of $\gamma$-$\delta$ pairs provided by the process can be updated using feedback from sensors, for example the wave-front sensor 108. This tends to allow for faster processing and more accurate estimations.

The above described Inverse Preisach model is used to compensate for hysteresis in a system. In the following embodiment, the Inverse Preisach model is used to compensate for hysteresis in an adaptive optics system.

The adaptive optics system described in the following embodiment comprises the same deformable mirror 101 (i.e. the same actuator 102 and mirror 104) present in the mirror interrogation system 99. This is so that the inverse Preisach information generated by the mirror interrogation system 99 (as described above) can be used to compensate for hysteresis in the adaptive optics system, i.e. the inverse Preisach information is derived from the particular deformable mirror 101. Alternatively, in other embodiments a deformable mirror of the same type as the deformable mirror that has been interrogated and had inverse Preisach information generated for it, for example a deformable mirror manufactured to the same specifications as those of the interrogated deformable mirror, is used. In other embodiments, a deformable mirror is arranged as part of a mirror interrogation system and as part of an adaptive optics system at the same time.

Figure 10:
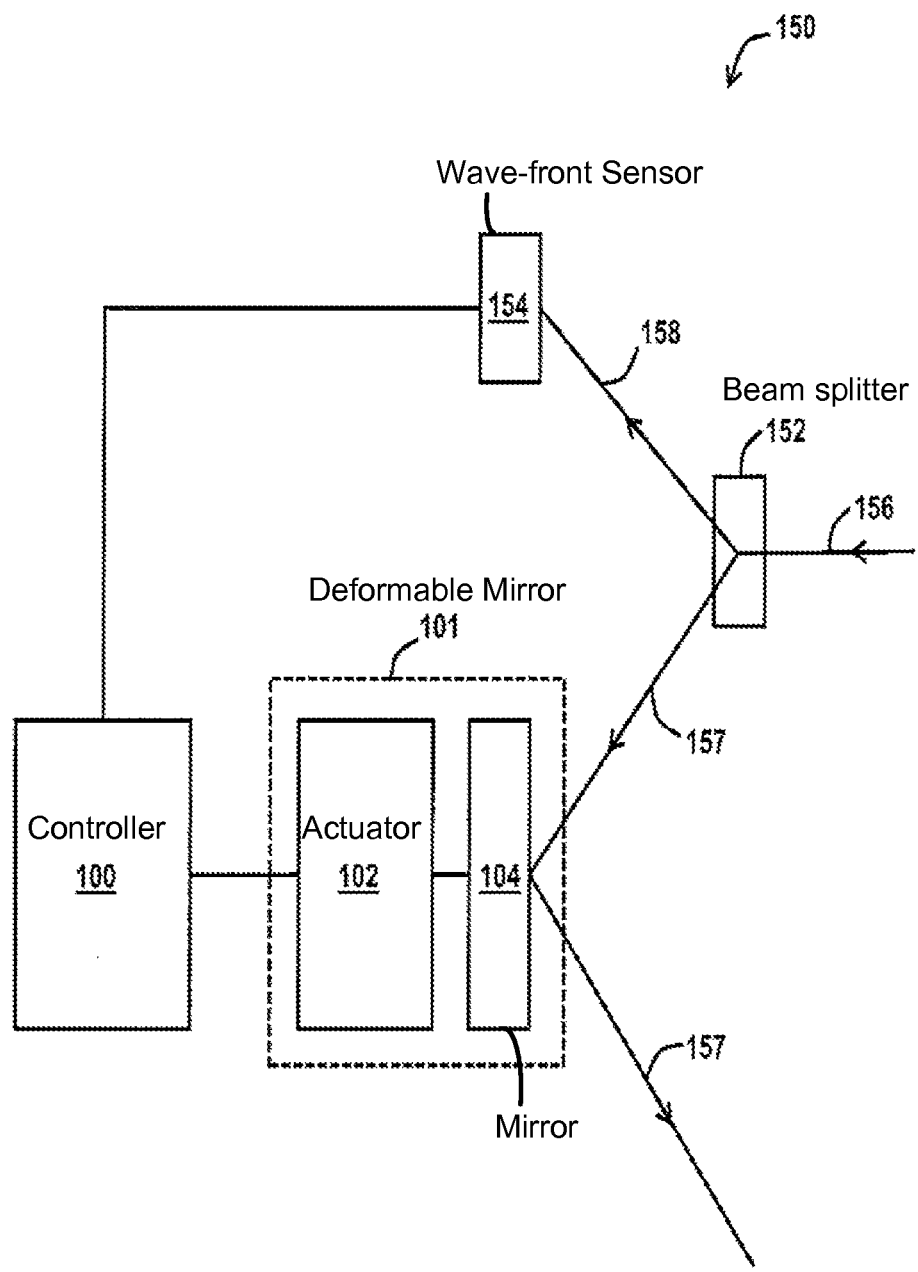
FIG. 10 is a schematic illustration of an adaptive optics system.

FIG. 10 is a schematic illustration of an adaptive optics system 150 in which an embodiment of compensating for hysteresis is implemented.

The adaptive optics system 150 comprises the controller 100, the deformable mirror 101, a further beam splitter 152, and a further wave-front sensor 154. The deformable mirror 101 comprises the actuator 102 and the mirror 104.

In this embodiment, a beam of light is split and reflected by the adaptive optics system 150. The beam of light is indicated by arrows in FIG. 10. For clarity and ease of understanding, the beam of light is shown as separate sections: a first section of the beam of light that is incident on the further beam splitter 152, (the first section is hereinafter referred to as the "further incident beam 156"); a second and a third section of the beam of light that are formed by the further beam splitter 152 splitting the further incident beam 156. The second section is hereinafter referred to as the "mirror beam 157", and is reflected by the mirror 104. The third section is hereinafter referred to as the "sensor beam 158") and is incident on the further wave-front sensor 154.

In this embodiment, the actuator 102 deforms the mirror 104 to generate a spherical surface to enable the system to correct for spherical aberrations.

The further wave-front sensor 154 detects the sensor beam 158. The further wave-front sensor 154 sends a signal corresponding to the detected sensor beam 158, i.e. a signal corresponding to the further incident beam 156, to the controller 100.

The controller 100 receives the signal corresponding to the detected sensor beam 158 from the further wave-front sensor 154. The processor in the controller uses the signal corresponding to the detected sensor beam 158 to determine a value corresponding to the displacement of the mirror 104, i.e. a value for the output y of the Preisach model. The processor further generates a control signal using the above described Inverse Preisach model, i.e. the input x using the determined output y. The control signal is sent to the actuator 102, and the actuator 102 deforms the mirror 104 depending on the received control signal. In this way, the hysteresis experienced by the mirror 104 resulting from operation in response to the further incident beam 156 is compensated for.

In the above embodiments, the light can be of any wavelength, for example infra-red.

In the above described embodiment, a grid of $\gamma$-$\delta$ pairs is defined. In this embodiment, the spacing between the grid pairs is small. In the above described embodiment 8001 grid points are implemented. Typically, the larger the number of grid points, the more accurate the estimates of the input x to the system are.

In the above embodiments, the output y (shown in FIG. 7) produced when the input x is alternately increased and decreased according to the $\alpha$-$\beta$ graph shown in FIG. 5, comprises four vertices. However, in other embodiments, the input x is alternately increased and decreased in a different manner, i.e. the $\alpha$-$\beta$ graph for input x has a different number of vertices. Thus, in other embodiments, the output y produced by the input x is different, for example, the output y may have a different number of vertices in the $\gamma$-$\delta$ space.

In the above embodiments, the congruency property does not hold for the output y. However, in other embodiments, the congruency property does hold for the output y.

In the above embodiments, the grid of $\gamma$-$\delta$ pairs, as shown in FIG. 9, is a rectangular grid. However, in other embodiments the points of the $\gamma$-$\delta$ grid, i.e. the $\gamma$-$\delta$ pairs, are distributed in a different appropriate manner. For example, in other embodiments the grid of $\gamma$-$\delta$ pairs is a triangular grid. The process of bilinear or linear interpolation used to determine values of $x_{\gamma\delta}$ for values of $\gamma$ and/or $\delta$ not on the grid, is modified accordingly, or a different appropriate process is used, to account for the grid of $\gamma$-$\delta$ pairs.

In the above described embodiments, the values of $x_{\gamma\delta}$ for each $\gamma$-$\delta$ pair on the grid of $\gamma$-$\delta$ pairs are determined one at a time, as described above with reference to steps s4-s10 of the above described method, and FIG. 8. However, in other embodiments some or all of the values of $x_{\gamma\delta}$ for each $\gamma$-$\delta$ pair on the grid of $\gamma$-$\delta$ pairs are determined concurrently, for example by implementing steps s4-s8 of the above described method concurrently on different specimens of a particular material.

In the above embodiments, the values of $x_{\gamma\delta}$ for each $\gamma$-$\delta$ pair on the grid of $\gamma$-$\delta$ pairs are determined by increasing the output to $\gamma$, then decreasing the output to $\delta$. However, in other embodiments, the values of $x_{\gamma\delta}$ are determined in a different manner. For example, a series of $x_{\gamma\delta}$ values could be found by increasing the output to a particular value, and then decreasing the output to a series of values, each value lower than the last.

Returning to FIG. 6, the controller 100 implements inter alia the various method steps described above. The controller may be implemented or provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

A further optional process of adaptively updating the Inverse Preisach model may be incorporated into the above described Inverse Preisach process to provide a further embodiment of an Inverse Preisach process. This further embodiment will now be described. In this further embodiment, the deformable mirror is arranged as part of the mirror interrogation system and as part of the adaptive optics system at the same time.

The above described formula used to determine the input x for a series system of outputs is adapted as follows:

$$x = \sum_{k=1}^{n}(x_{\gamma_k\delta_k} - x_{\gamma_k\delta_{k-1}})$$

$$= \left[\sum_{k=1}^{n-1}(x_{\gamma_k\delta_k} - x_{\gamma_k\delta_{k-1}}) - x_{\gamma_n\delta_{n-1}}\right] + x_{\gamma_n\delta_n}$$

where x is the estimation of the input to the system based on the above described embodiment of an Inverse Preisach model. Thus, the following formula holds:

$$x_A = \left[\sum_{k=1}^{n-1}(x_{\gamma_k\delta_k} - x_{\gamma_k\delta_{k-1}}) - x_{\gamma_n\delta_{n-1}}\right] + [x_{\gamma_n\delta_n} + (x_A - x)]$$

where $x_A$ is the actual input to the system (required to produce the desired output).

Thus, adjusting the value of $x_{\gamma_n\delta_n}$ by an amount proportional to $(x_A-x)$ increases the accuracy of the estimation of the input to the system x based on the above described embodiment of an Inverse Preisach model. If the γ-δ pair $(\gamma_n, \delta_n)$ is a grid point, then $x_{\gamma_n\delta_n}$ is adjusted by an amount proportional to $(x_A-x)$. However, in this embodiment, the γ-δ pair $(\gamma_n, \delta_2)$ is unlikely to be a grid point on the above described grid of γ-δ pairs. Therefore, the grid points surrounding the γ-δ pair $(\gamma_n, \delta_n)$ are each adjusted by an amount equal to $k(x_A-x)$, where k is a constant. In this embodiment k=0.005. The value k=0.005 tends to provide the most improved estimate of the input x for the above described embodiment of the Inverse Preisach model. The value of $x_{\gamma_n\delta_n}$ is calculated as described above using bilinear or linear interpolation.

In practice, it may not be possible to determine a value of $x_A$. However, the output y as a function of the input x tends to be smooth. Thus, the value of $k(x_A-x)$ may be estimated by the following term:

$K(y_A-\delta_n)$ where:

K is a constant; and $y_A$ is the actual output of the system (after applying voltage x); and $\delta_n$ is the required output.

The actual output of the system $y_A$ may be determined by any appropriate means. For example, the actual output of the system $y_A$ may be determined by directly coupling a strain gauge or a capacitive sensor to the mirror 104, or by implementing the mirror interrogation system 99, as described above with reference to FIG. 6, i.e. by using a wave-front sensor.

In the above embodiments, the grid points surrounding the γ-δ pair $(y_n, \delta_n)$ are each adjusted by an amount equal to $k(x_A-x)$ (or $K(y_A-\delta_n)$). For example, the four points surrounding the particular grid point $(\gamma_n, \delta_n)$ are each adjusted. In other examples a different number of points can be adjusted. For example, in other embodiments more than four points surrounding the particular grid point $(\gamma_n, \delta_n)$ are each adjusted by different amounts. An advantage provided by this is that more accurate estimations tend to be produced.

The above described adaptive updating process tends to provide that a grid of γ-δ pairs in which the spacing between the grid pairs is small, is not necessary. Indeed, the adaptive updating process tends to provide more accurate results using a grid of γ-δ pairs in which the spacing between the grid pairs is larger. In this embodiment, 351 γ-δ pairs are utilised. This tends to advantageously allow for faster computation of the estimated values.

In the above embodiments, the value of the constant k used in the adaptive updating process is 0.005. However, in other embodiments different values of k are used.

The above described adaptive updating process advantageously provides that the grid of γ-δ pairs (or the grid of α-β pairs) used in the process can be updated using feedback from sensors. This tends to provide more accurate estimations.

In the above embodiments, the controller comprises a processor which uses the signal corresponding to the detected feedback beam to determine a value corresponding to the displacement of the deformable mirror, i.e. a value for the output y of the Preisach model. However, in other embodiments the value corresponding to the displacement of the deformable mirror is determined in a different appropriate way. For example, in other embodiments the processor determines the displacement of the deformable mirror using signals from sensors that directly measure the displacement of the deformable mirror.

In the above embodiments, the deformable mirror comprises a mirror that is deformed by an actuator. However, in other embodiments the deformable mirror is a different appropriate type of deformable mirror, for example a bimorph mirror.

In a further embodiment, the actuator 102 is used to control the position of the mirror 104 to generate a piston action, correcting phase. In a further embodiment, a discrete array of such phase correctors is used to generate a multi-element deformable mirror. Each discrete corrector can be controlled as described above.

In the above embodiments, the output y of the Preisach model is a value of the displacement of the deformable mirror. However, in other embodiments the output y of the Preisach model is a different appropriate parameter. For example, in other embodiments the output is the measured value of the feedback beam detected by the wave-front sensor.

In the above embodiments, the input x of the Preisach model is a value of the input voltage (control signal) received by the actuator. However, in other embodiments the input x of the Preisach model is a different appropriate parameter.

In the above embodiments, the processor generates the control signal, i.e. the input x for the Preisach model, using the determined output y. However, in other embodiments the control signal is generated using different means, or a combination of means. For example, in other embodiments the control is determined from a user input.

In the above embodiments, a wave-front sensor is used to provide the signal corresponding to the detected feedback beam, i.e. a signal corresponding to the curvature of the mirror. However, in other embodiments a different appropriate device is used. For example, a strain gauge or capacitive sensor directly coupled to the mirror could be used.

In the above embodiments, hysteresis is compensated for in a deformable mirror of an adaptive optics system. However, in other embodiments, hysteresis is compensated for in any appropriate material of the adaptive optics system. Also, in other embodiments, hysteresis is compensated for in other materials of other appropriate systems, for example systems other than optics systems. In these embodiments, the input and output of the Preisach model are different appropriate parameters.

The invention claimed is:

1. A method of compensating for hysteresis in a system, the method comprising:
   providing a system, the system comprising an actuator and one or more components that exhibit hysteresis including a deformable material, the components that exhibit hysteresis having a wiping-out property, the system comprising a system input and a system output, the system output being dependent on the system input;
   determining an inverse Preisach model for the system, the inverse Preisach model comprising a model input and a model output, the model output being dependent on the model input, the model input corresponding to the system output, the model output corresponding to the system input;
   ascertaining a desired system output;
   determining using the desired system output and the inverse Preisach model for the system, a required system input corresponding to the desired system output; and
   applying, to the system, the determined required system input to deform the deformable material using the actuator; wherein the step of determining the inverse Preisach model for the system comprises:
   defining a plurality of pairs of values, each pair of values comprising a first value and a second value, each of the first and second values being less than or equal to a maximum system output and greater than or equal to a minimum system output, the first value being greater than or equal to the second value within each pair; and
   for each pair of values, determining a system input corresponding to that pair of values, by:
   increasing the system input, from the minimum system input, until the system output is equal to the first value corresponding to the respective pair of values; and thereafter
   decreasing the system input until the system output is equal to the second value corresponding to the respective pair of values, the value that the system input is decreased to being the determined system input corresponding to that pair of values.

2. A method according to claim 1, wherein determining the required system input comprises determining a value of an input x to the system using the following formula:

$$x = \int\int_{\gamma \geq \delta} \lambda(\gamma, \delta) \varepsilon_{\gamma\delta}(y) d\gamma d\delta$$

Where:
   y is an output of the system;
   γ is the level to which the output y has been increased as the input x has been increased;
   δ is the level to which the output y has been decreased as the input x has been decreased;
   λ(γ, δ) is a density function; and
   $\epsilon_{\gamma\delta}(y)$ is the output of an imaginary hysteron having parameters γ and δ.

3. A method according to claim 1, wherein determining the required system input further comprises determining a value of an input x to the system using the following formula:

$$x = \sum_{k=1}^{n} (x_{\gamma_k \delta_k} - x_{\gamma_k \delta_{k-1}})$$

where:
   $x_{\gamma_i \delta_j}$ is an input of the system that has resulted in the system output y being increased from the minimum output to $\gamma_i$ and then decreased to $\delta_j$; and
   $\delta_0$ is the minimum output.

4. A method according to claim 3, wherein
   for all required values of $x_{\gamma_i \delta_j}$ where $\gamma_i$ and $\delta_j$ are not in the defined plurality of pairs of values, the value of $x_{\gamma_i \delta_j}$ are determined using a process of interpolation using values of $x_{\gamma\delta}$ where γ and δ are in the defined plurality of pairs of values.

5. A method according to claim 4, wherein the input x is an input voltage of the actuator that deforms the deformable material, and the output y is a value of a displacement of the deformable material.

6. A method according to claim 1, the method further comprising a process of determining an updated required input to the system, the determining process comprising:
   measuring a value of the input to the system; and
   determining the updated required input to the system using the determined required input to the system and the measured required input to the system.

7. A method according to claim 1, the method further comprising a process of determining an updated required input to the system, the determining process comprising:
   measuring a value of the output of the system to determine a measured output value corresponding to the determined required input; and
   determining the updated required input to the system using the measured output value and the output of the system.

8. The method of claim 1, wherein the deformable material comprises a deformable mirror.

9. A computer program product comprising a non-transitory computer-readable medium having instructions encoded thereon and arranged such that when executed by a computer system cause the computer system to perform a method relating to a system, the system comprising an actuator and one or more components that exhibit hysteresis including a deformable material, the components that exhibit hysteresis having a wiping-out property, the system comprising a system input and a system output, the system output being dependent on the system input, the method comprising:
   determining an inverse Preisach model for a system, the inverse Preisach model comprising a model input and a model output, the model output being dependent on the model input, the model input corresponding to the system output, the model output corresponding to the system input;
   ascertaining a desired system output;
   determining using the desired system output and the inverse Preisach model for the system, a required system input corresponding to the desired system output; and
   applying, to the system, the determined required system input to deform the deformable material using the actuator; wherein the step of determining the inverse Preisach model for the system comprises:
   defining a plurality of pairs of values, each pair of values comprising a first value and a second value, each of the first and second values being less than or equal to a maximum system output and greater than or equal to a minimum system output, the first value being greater than or equal to the second value within each pair; and for each pair of values, determining a system input corresponding to that pair of values, by:

increasing the system input, from the minimum system input, until the system output is equal to the first value corresponding to the respective pair of values; and thereafter decreasing the system input until the system output is equal to the second value corresponding to the respective pair of values, the value that the system input is decreased to being the determined system input corresponding to that pair of values.

10. An apparatus, the apparatus comprising:

a system, the system comprising an actuator and one or more components that exhibit hysteresis including a deformable material, the components that exhibit hysteresis having a wiping-out property, the system comprising a system input and a system output, the system output being dependent on the system input;

one or more processors configured to:

determine an inverse Preisach model for the system, the inverse Preisach model comprising a model input and a model output, the model output being dependent on the model input, the model input corresponding to the system output, the model output corresponding to the system input;

ascertain a desired system output;

determine, using the desired system output and the inverse Preisach model for the system, a required system input corresponding to the desired system output; and apply, to the system, the determined required system input to deform the deformable material using the actuator;

wherein determining an inverse Preisach model for the system further causes the one or more processors to:

define a plurality of pairs of values, each pair of values comprising a first value and a second value, each of the first and second values being less than or equal to a maximum system output and greater than or equal to a minimum system output, the first value being greater than or equal to the second value within each pair; and determine, for each pair of values, a system input corresponding to that pair of values, by:

increase the system input, from a minimum system input, until the system output is equal to the first value corresponding to the respective pair of values; and thereafter, decrease the system input until the system output is equal to the second value corresponding to the respective pair of values, the value that the system input is decreased to being the determined system input corresponding to that pair of values.

11. The system according to claim 10 comprising an adaptive optics system.

12. The system according to claim 10, wherein the deformable material comprises a deformable mirror.

* * * * *